United States Patent
Ma

(10) Patent No.: US 7,028,200 B2
(45) Date of Patent: Apr. 11, 2006

(54) METHOD AND APPARATUS FOR ADAPTIVE POWER MANAGEMENT OF MEMORY SUBSYSTEM

(75) Inventor: Kenneth Ma, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 665 days.

(21) Appl. No.: 10/163,746

(22) Filed: Jun. 5, 2002

(65) Prior Publication Data

US 2003/0229821 A1 Dec. 11, 2003

(51) Int. Cl.
*G06F 1/32* (2006.01)
(52) U.S. Cl. ........................... 713/324; 713/320
(58) Field of Classification Search ............... 713/300, 713/320, 324
See application file for complete search history.

(56) References Cited

U.S. PATENT DOCUMENTS

| | | | |
|---|---|---|---|
| 5,546,568 A * | 8/1996 | Bland et al. ............... 713/501 |
| 6,125,450 A | 9/2000 | Kardach |
| 6,141,283 A | 10/2000 | Bogin et al. |
| 6,269,433 B1 | 7/2001 | Jones et al. |
| 6,304,978 B1 | 10/2001 | Horigan et al. |
| 6,385,113 B1 * | 5/2002 | Longwell et al. .......... 365/222 |
| 6,389,514 B1 | 5/2002 | Rokicki |
| 6,442,698 B1 * | 8/2002 | Nizar ......................... 713/320 |
| 6,449,683 B1 * | 9/2002 | Silvester .................... 711/103 |
| 6,618,791 B1 * | 9/2003 | Dodd et al. ................ 711/105 |
| 6,633,987 B1 * | 10/2003 | Jain et al. .................. 713/300 |
| 6,678,831 B1 * | 1/2004 | Mustafa et al. ............ 713/320 |
| 6,775,784 B1 * | 8/2004 | Park .......................... 713/320 |
| 6,781,911 B1 * | 8/2004 | Riesenman et al. ........ 365/226 |
| 6,795,896 B1 * | 9/2004 | Hart et al. .................. 711/118 |
| 2001/0044909 A1 * | 11/2001 | Oh et al. ..................... 713/600 |
| 2002/0194509 A1 * | 12/2002 | Plante et al. ................ 713/300 |

FOREIGN PATENT DOCUMENTS

WO WO 01/73529 10/2001

OTHER PUBLICATIONS

Compaq/Intel/Microsoft/Phoenix/Toshiba: "Advanced Configuration and Power Interface Specification Rev 2.0 Excerpts (pp21-26, 211-230)" ACPI Specification, Online, Jul. 27, 2000, Retrieved from the Internet Mar. 9, 2004.
Compaq Computer Corporation, Intel Corporation, Microsoft Corporation, Phoenix Technologies Ltd., Toshiba Corporation, *Advanced Configuration and Power Interface Specification, Revision 1.0b* (Feb. 2, 1999).
Jedec Standard Double Data Rate (DDR) SDRAM Specfication, *JESD79, Jedec Solid State Technology Association, Release 1* (Jun. 2000).

* cited by examiner

*Primary Examiner*—Chun Cao
(74) *Attorney, Agent, or Firm*—McAndrews, Held & Malloy, Ltd.

(57) ABSTRACT

A method and apparatus are disclosed for performing adaptive memory power management in a system employing a CPU and a memory subsystem. A CPU throttle control (THR) module generates a CPU throttle control signal indicating when the CPU is idle. A memory controller (MC) module generates memory power management signals based on at least one of the CPU throttle control signal, memory read/write signals, memory access break events, and bus master access requests. Certain portions of the memory subsystem are powered down in response to the memory power management signals. Memory power management is performed on a time segment by time segment basis to achieve efficient power management of the memory subsystem during CPU run time.

16 Claims, 4 Drawing Sheets

METHOD AND APPARATUS FOR ADAPTIVE POWER MANAGEMENT OF MEMORY SUBSYSTEM

RELATED APPLICATIONS

The present application claims priority to and the benefit of application Ser. No. 10/146,554, filed on May 15, 2002, and incorporates said application herein by reference in its entirety.

BACKGROUND OF THE INVENTION

Advanced CPU's and embedded processors are achieving higher performance as time goes on. However, memory subsystems are requiring lower latency and more bandwidth to sustain performance. Dynamic random access memory (DRAM), for example, is getting faster in clock speed, wider in bus size, and larger in capacity. As a result, DRAM is consuming more power and generating more heat. The wider bus effectively increases the memory subsystem power consumption linearly, whether it is for embedded appliances, Desktop/Notebook PC's, or high-density Server applications.

A CPU is the computing and control hardware element of a computer-based system. In a personal computer, for example, the CPU is usually an integrated part of a single, extremely powerful microprocessor. An operating system is the software responsible for allocating system resources including memory, processor time, disk space, and peripheral devices such as printers, modems, and monitors. All applications use the operating system to gain access to the resources as necessary. The operating system is the first program loaded into the computer as it boots up, and it remains in memory throughout the computing session.

Typical PC systems use either 64-bit or 128-bit DRAM subsystems. In the latter case, the memory subsystem is usually organized as two independent 64-bit memory controllers (MC). Various types of DRAM may be powered down through either a physical power-down signal, such as a clock enable CKE signal, or through a packetized power-down command sent through a high-speed serial bus.

For double data rate (DDR) synchronous DRAM, for example, de-asserting a CKE signal (low) puts the corresponding memory row of the DRAM into a power down state. Asserting the CKE signal (high) brings the memory row back to a full operating state. The CKE signal may be dynamically toggled on every rising edge of the SDRAM clock.

A typical 64-bit memory controller (MC) may support between two and four SDRAM dual in-line memory modules (DIMM). Each DIMM has up to two memory rows (each side of a double-sided DIMM is called a memory row), and each memory row may have multiple internal memory banks. Each bank comprises multiple memory pages, one page from each DRAM chip of the memory row.

Typically, if a MC may put each memory row of multiple DIMM modules independently and dynamically into and out of the power down states using the CKE signal, then the MC is said to support dynamic CKE DRAM power management. However, dynamic CKE is typically supported only in power-sensitive appliances such as notebook PC's or PDA's and is not available for desktop PC's for various reasons.

Even for mobile designs, system designers have not been aggressive in DRAM power management since it would mean turning on an auto pre-charge option that pre-charges and closes a given DRAM bank after every access if there is no pending access to the bank. However, if the CPU or a bus master initiates an access to the same bank after it has been closed, a longer latency will be incurred due to row-to-column delay. If an access is initiated immediately after the auto pre-charge is started, an additional delay will be incurred due to the pre-charge.

It is known that some MC's perform selective auto pre-charging that use least recently used (LRU) or other algorithms to close only those rows that are most unlikely to be accessed next, in order to minimize incurred latencies. It is also known that some implementations look into a read/write command FIFO to determine which banks to close to minimize the latency impact. This may be effective but still cannot predict which memory banks will be accessed next. Some power management schemes also use certain statistical and prediction methods to determine which memory banks will be accessed next but are not maximally effective.

An operating system may keep track of the percentage of time that the CPU is idle and writes the idle percentage value to a register. For example, the CPU may have been idle for about 40% of a last predefined time period. Different operating systems use different windows of time to compute the idle percentage value. Older operating systems have longer idle loops. Newer operating systems have shorter idle loops in order to accommodate as many tasks as possible running simultaneously.

In most systems, the performance of the processor may be altered through a defined "throttling" process and through transitions into multiple CPU performance states.

Certain CPU power management schemes are known which use statistical methods to monitor CPU host interface (sometimes known as Front-Side Bus) activities to determine average CPU percent utilization and set the CPU throttling accordingly. However, advanced CPUs incorporate large cache memory that hide greater than 90% of the CPU activities within the CPU core. Therefore, the FSB percent utilization has little correlation to the actual core CPU percent utilization. As a result, prior implementations cannot correctly predict idle states of CPUs with super-pipelined architectures and integrated caches.

If it is not known, in a most effective way, when the CPU may be powered down, then it is not known when the CPU may issue any additional read/write accesses to memory. Therefore, the memory may not be powered down most effectively because, once the CPU issues a memory access, if the memory is powered down, performance may be jeopardized.

It is desirable to know, in an efficient manner, when the CPU is idle and the states of various memory-related functions in order to most effectively power down portions of the memory subsystem without comprising system performance.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide a method and apparatus for performing adaptive memory power management in a system employing a central processing unit (CPU) and a memory subsystem. In particular, certain embodiments provide for controlling the throttling of the CPU and monitoring actual processes of the memory subsystem from one time segment to another and determining which portions of the memory subsystem to power down for at least the next time segment based on the throttling of the CPU and the monitored memory processes.

An embodiment of the present invention provides for adaptively powering down portions of memory of a computer-based system employing a CPU and a memory subsystem. Determinations of whether or not the CPU is idle are performed and memory access break events and pending memory read/write accesses are monitored to determine when to close certain memory banks and power down certain portions of the memory subsystem.

A method of the present invention provides for determining if a CPU of a system employing a CPU and a memory subsystem is currently idle. The method also determines if any bus master initiated memory access break events have occurred and if there are any pending read or write accesses to the memory subsystem. Certain memory banks of the memory subsystem are pre-charged and closed based on the determinings, and certain portions of the memory subsystem are powered down when all the memory banks of the certain portions are closed.

Apparatus of the present invention provides a CPU throttle control (THR) module to generate a CPU throttle control signal indicating when the CPU is idle. A memory controller (MC) module is also provided to generate memory power management signals based on at least one of the CPU throttle control signal, memory read/write signals, memory access break events, and bus master access requests. The memory power management signals are used to power down certain portions of the memory subsystem when all of the memory banks of the portions are closed.

Certain embodiments of the present invention afford an approach to perform adaptive run-time memory power management for a system employing a CPU and a memory subsystem by controlling the throttle state of the CPU and monitoring memory-related signals and functions from one time segment to another.

These and other advantages and novel features of the present invention, as well as details of an illustrated embodiment thereof, will be more fully understood from the following description and drawings.

DETAILED DESCRIPTION OF THE INVENTION

Figure 1:
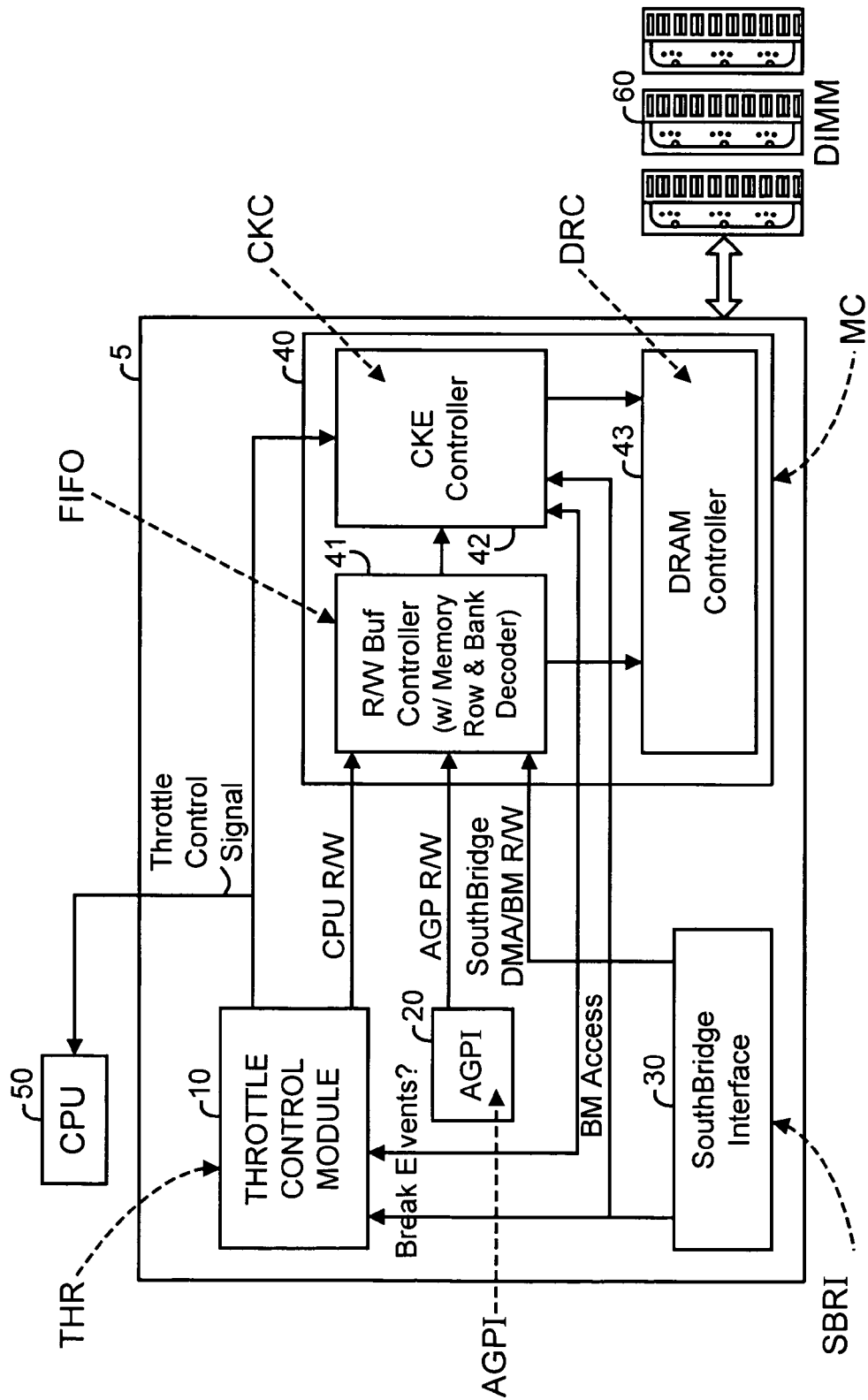
FIG. 1 is a schematic block diagram of an apparatus for achieving adaptive memory power management in accordance with an embodiment of the present invention.

FIG. 1 is a schematic block diagram of a memory power management system 5 interfacing to a CPU 50 and a memory subsystem 60 in accordance with an embodiment of the present invention. Memory power management system 5 includes a CPU throttle control (THR) module 10, an accelerated graphics port interface (AGPI) module 20, a southbridge interface (SBRI) module 30, and a memory controller (MC) module 40.

Other embodiments of the present invention may not include an AGPI module or a southbridge module but may instead include other interfaces to interface to other subsystems.

In accordance with an embodiment of the present invention, the MC module 40 includes a read/write buffer controller (FIFO) module 41, a DRAM controller (DRC) module 43, and a DRAM clock enable controller (CKC) module 42.

The THR module 10 performs CPU profiling, collects statistics of CPU performance, and performs intelligent predictions to generate an adaptive CPU throttle control signal to control the throttling of the CPU. The THR module 10 controls the throttling of the CPU on a time segment by time segment basis and communicates to the MC module 40 when the CPU is idle and whether there are any pending CPU memory accesses. The above incorporated application Ser. No. 10/146,554, filed on May 15, 2002 discloses such a THR module.

In an embodiment of the present invention, the CPU throttle control signal comprises a CPU stop clock signal that is fed back to a STPCLK# signal input of the CPU. The CPU stop clock signal may be a digital logic high during a portion of a run-time segment and a digital logic low during another portion of the run-time segment. When the CPU stop clock signal is a logic high, the CPU begins processing and when the CPU stop clock signal is a logic low, the CPU stops processing.

As a result, the duty cycle of the CPU stop clock signal controls the throttling of the CPU 10 on a time segment by time segment basis. The duty cycle of the CPU stop clock signal is adjusted for each run-time segment based on the most recently computed CPU throttle percentage value and CPU percent idle value for the last run-time segment (see application Ser. No. 10/146,554. If it is known when the CPU is idle or powered up, then the memory subsystem 60 may be powered down as long as there are no pending bus master access requests.

As an alternative, if it is known when the CPU is powered down, then the entire memory subsystem may be dedicated to, for example, the graphics and other input/output (I/O) subsystems.

In an embodiment of the present invention, AGPI module 20 interfaces between an AGP graphics device and MC module 40. The AGPI module 20 generates break events and bus master accesses to inform the THR module 10 and the MC module 40 that bus master devices need servicing. A bus master directs traffic on a computer bus or I/O paths. The bus master is the "master" and the target device being accessed is the "slave". The bus master controls the bus paths on which the address and control signals flow. In other embodiments of the present invention, the AGPI module may instead be, for example, an interface module interfacing between the MC module 40 and a PCI device, a PCI express device, or a 3GIO device.

In an embodiment of the present invention, SBRI module 30 interfaces between Southbridge/Bus Master/DMA devices and the MC module 40. The SBRI module 30 generates break events and bus master accesses to inform the THR module 10 and the MC module 40 that bus master devices need servicing. A Southbridge is a chipset that manages the basic forms of input/output (I/O) such as Universal Serial Bus (USB), serial, audio, integrated drive electronics (IDE), and PCI bus in a computer-based system. Direct Memory Access (DMA) is a capability provided by some computer bus architectures that allows data to be sent directly from an attached device (e.g. a disk drive) to the memory subsystem 60. The CPU is freed from involvement with the data transfer.

Other embodiments of the present invention are not restricted to northbridge/southbridge architectures, however.

The FIFO module 41 detects any pending read or write cycles from the CPU or bus master devices and stores memory access information. The FIFO module 41 decodes memory banks and memory rows to be accessed and also employs least-recently used (LRU) logic. Decoding means that, when there is a pending memory access, the FIFO module 41 may tell the CKC module 42 which banks and rows are going to be accessed next. FIFO module 41 may optionally include prediction logic to predict which banks are most likely to be accessed next and keep them open as long as necessary.

The CKC module 42 monitors the CPU throttle control signal and looks at information from the FIFO module 41 to determine which memory banks of the memory subsystem 60 (e.g. DIMM modules) are not going to be accessed any time soon and, therefore, may be closed. By monitoring the CPU throttle control signal and information in the FIFO module 41, the CKC module 42 may determine whether the CPU is fully operational (On state) or in a power-down state (e.g. Stop Grant, Stop Clock, or Deep Sleep states). The CKC module 42 also takes bus master access and break event information from the AGPI and SBRI so any new or pending bus master accesses will command the CKC module 42 to instruct the DRC module 43 to prepare the DIMM 60 for an upcoming access.

The DRC module 43 controls the electrical interface and timing signals to the physical DIMM modules 60, including memory power management signals. The DRC module 43 accepts commands from CKC module 42 to pre-charge and close memory banks of the DIMM modules 60 and to power down certain portions of the DIMM modules 60.

In an embodiment of the present invention, the memory power management signals include clock enable (CKE) signals such that a corresponding memory row of the DIMM modules 60 is powered down when its corresponding CKE signal is de-asserted.

In another embodiment of the present invention, the memory power management signals include a packetized power-down command sent through a high-speed serial bus. Other embodiments of the present invention may comprise other electrical/physical interface protocols.

In general, the CKC module 42 will look at the CPU throttle control signal to determine if the CPU 50 is idle (power down state). The CKC module 42 will also look at the AGPI 20 and SBRI 30 modules to determine whether or not there are any pending bus master (BM) accesses or break events. The CKC module 42 also monitors the FIFO module 41 to determine if there are any pending read and write accesses from the CPU or bus masters. If none of this is the case, then the CKC module 42 may tell the DRC module 43 to close either a memory bank, multiple memory banks, or the entire memory subsystem 60, depending on the detected conditions.

Figure 2:
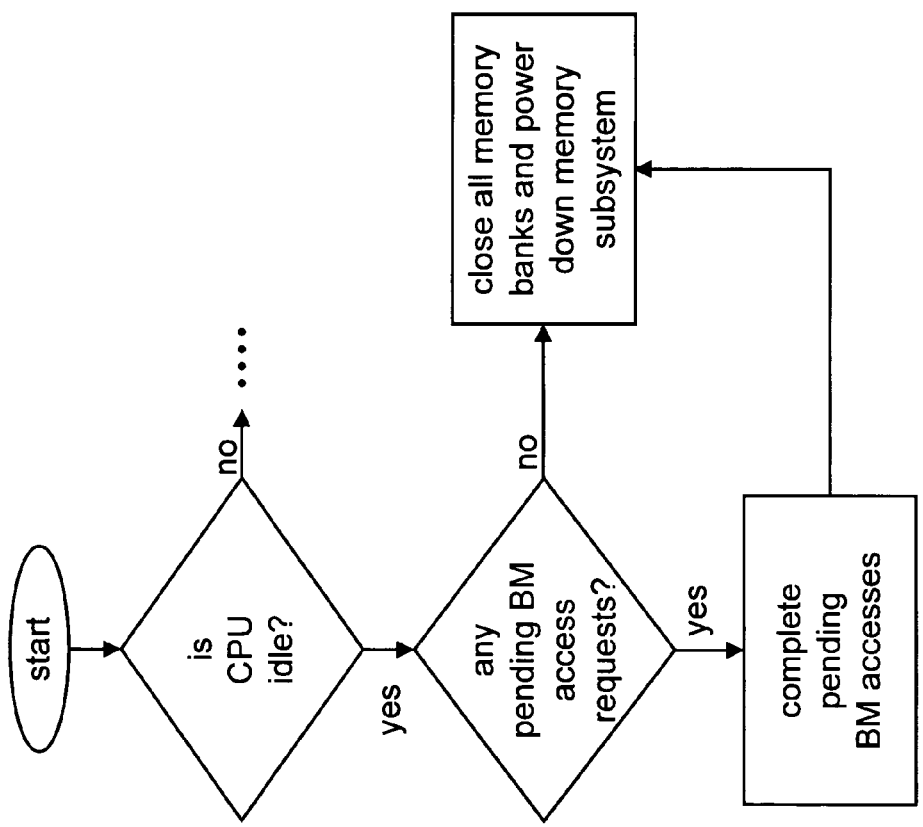
FIG. 2 is a flowchart of a first portion of a method for achieving adaptive memory power management using the apparatus in FIG. 1 in accordance with an embodiment of the present invention.

FIG. 2 is a flowchart of a first portion of a method for achieving adaptive memory power management using the apparatus in FIG. 1 in accordance with an embodiment of the present invention. In step 110, the memory power management system 5 determines if the CPU 50 is idle. If the CPU 50 is idle, then in step 120 the memory power management system 5 determines if there are any pending bus master access requests. If so, then the CKC module 42 informs the DRC module 43 to complete the pending bus master accesses (step 130) and then, in step 140, all memory banks are closed and the entire memory subsystem 60 (DIMM modules) are powered down. If there are no pending bus master access requests, then the CKC module 42 informs the DRC module 43 to perform step 140 immediately and power down the memory subsystem 60.

Figure 3:
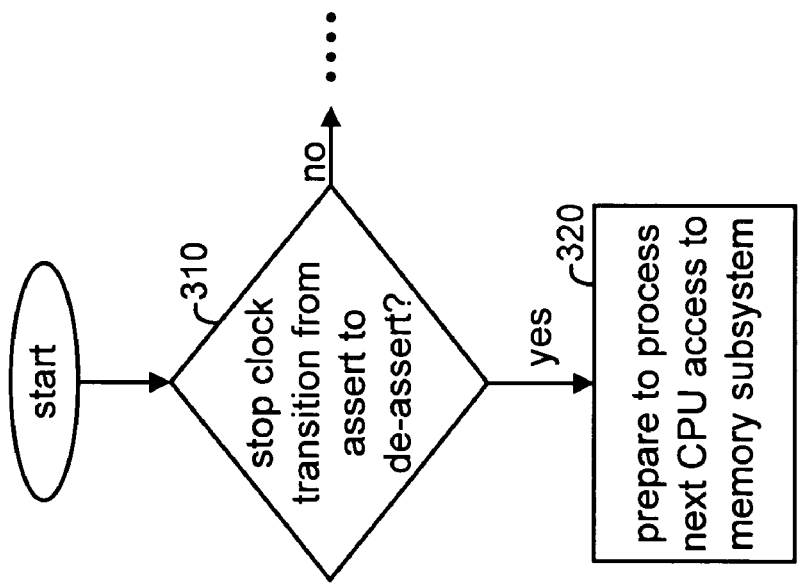
FIG. 3 is a flowchart of a second portion of a method for achieving adaptive memory power management using the apparatus in FIG. 1 in accordance with an embodiment of the present invention.

FIG. 3 is a flowchart of a second portion of a method for achieving adaptive memory power management using the apparatus in FIG. 1 in accordance with an embodiment of the present invention. If the CPU throttle control signal (e.g. STPCLK# signal) transitions from the assert state (CPU idle) to the de-assert state (CPU on) (step 310), then the CKC module 42 detects the change of the CPU throttle control signal and instructs the FIFO module 41 and DRC module 43 to prepare to process the next CPU access to the memory subsystem 60 (step 320) since the CPU 50 is being powered up upon the de-assertion of the throttle control signal.

Figure 4:
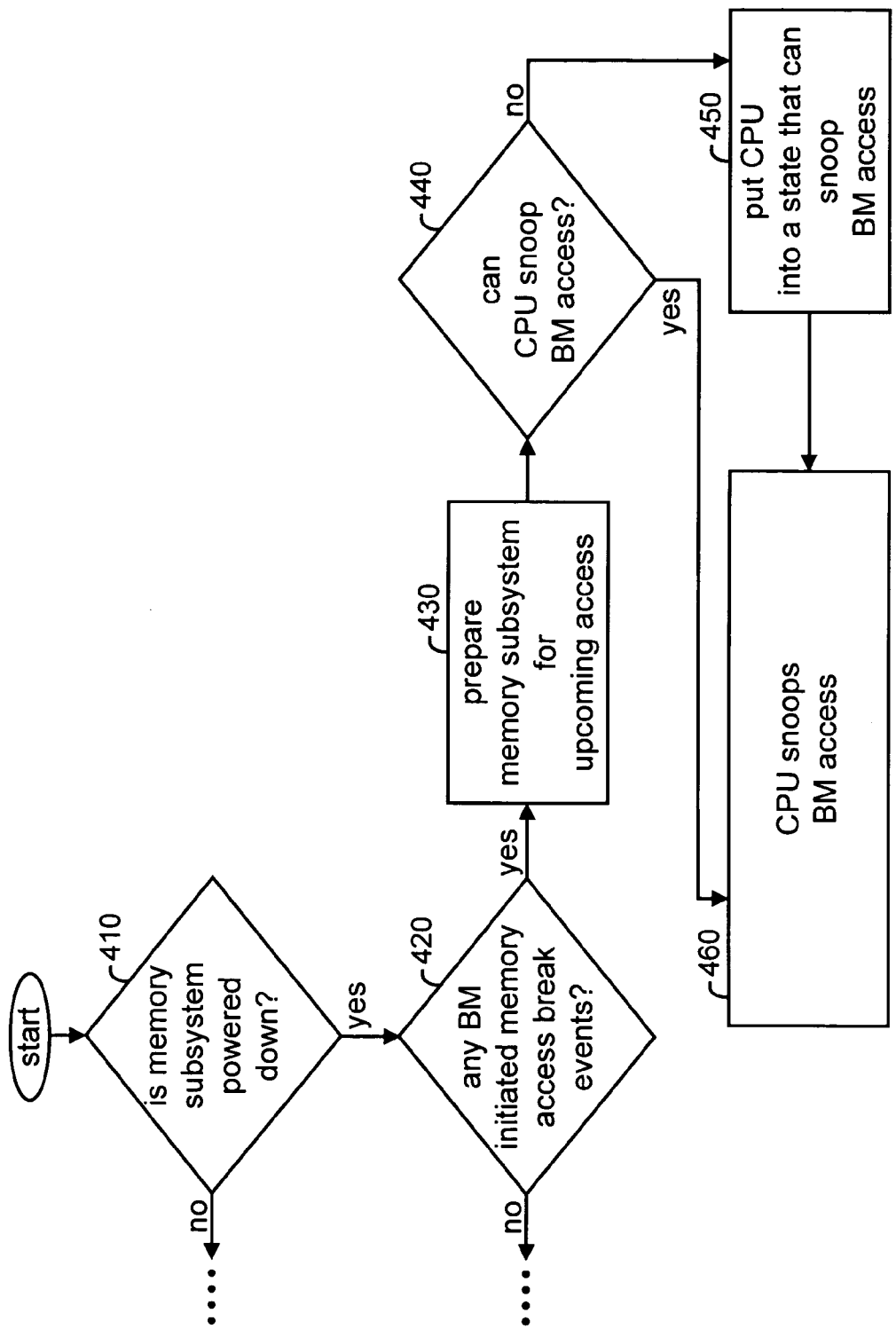
FIG. 4 is a flowchart of a third portion of a method for achieving adaptive memory power management using the apparatus in FIG. 1 in accordance with an embodiment of the present invention.

FIG. 4 is a flowchart of a third portion of a method for achieving adaptive memory power management using the apparatus in FIG. 1 in accordance with an embodiment of the present invention. If the memory subsystem 60 is powered down (step 410) and there are any bus master initiated memory access break events detected by the THR module 10 and/or CKC module 42 (step 420), then the CKC module 42 instructs the FIFO module 41 and DRC module 43 to prepare the memory subsystem 60 for an upcoming access (step 430). Next, it is determined if the CPU 50 may snoop for bus master accesses (step 440). If so, then the CPU 50 goes ahead and snoops (step 460). If not, then the CPU 50 may be put into a power state that can snoop bus master access (step 450) and then snoops for bus master accesses (step 460).

Microsoft et al. published the ACPI (Advanced Configuration Power Interface) power management specification that is intended to provide a standardized, operating system-independent and platform-independent power management mechanism to enable the OSPM (operating system-directed power management) initiative. An ACPI-compatible operating system may balance CPU performance versus power consumption and thermal states by manipulating the processor performance controls. OSPM is very effective for peripheral device power management, such as for UARTs or modems, since OSPM knows whether the port is opened or the modem is in use.

The ACPI specification defines a working state in which the processor executes instructions. Processor sleeping states, labeled C1 through C3, are also defined. In the sleeping states, the processor executes no instructions, thereby reducing power consumption and, possibly, operating temperatures.

Certain embodiments of the present invention are transparent to other power management protocols and are compatible with ACPI and OSPM. Certain embodiments of the present invention are independent of the operating system and CPU. Certain embodiments of the present invention provide more effective power savings over traditional power savings methods but may co-exist with traditional auto pre-charge mechanisms.

The various elements of memory power management system 5 may be combined or separated according to various embodiments of the present invention. For example, the FIFO module 41 and CKC module 42 may be combined to form a single module. Also, the AGPI module 20 and SBRI module 30 may be combined into a single module.

Also, the various modules may be implemented as various combinations of software and/or hardware modules.

In summary, certain embodiments of the present invention afford an approach to perform adaptive memory power management for a system employing a CPU and a memory subsystem by controlling the throttle state of the CPU and monitoring memory-related processes and functions to determine when to power down certain portions of the memory subsystem. As a result, higher CPU, I/O, and graphics performance may be achieved while saving power.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a system employing a CPU and a memory subsystem, a method for performing adaptive power management of said memory subsystem, said method comprising:
    determining if said CPU is idle by generating a CPU throttle control signal and controlling throttle of said CPU with said CPU throttle control signal;
    determining if any bus master initiated memory access break events have occurred;
    determining if there are any pending read accesses or write accesses to said memory subsystem;
    closing certain memory banks and powering down certain portions of said memory subsystem based on said determinings; and
    placing said CPU into a power state that can monitor bus master access if the following conditions are met;
        said memory subsystem is currently powered down;
        at least one of said bus master initiated memory access break events has just occurred; and
        said CPU is not currently in a power state that may monitor for a bus master access.

2. The method of claim 1 further comprising completing any pending bus master read accesses and write accesses to said memory subsystem if said CPU is idle and then closing all memory banks and powering down all of said memory subsystem.

3. The method of claim 1 further comprising preparing to process a next CPU access to said memory subsystem when said CPU throttle control signal transitions from an assert (CPU power down) state to a de-assert state (CPU on).

4. The method of claim 1 further comprising preparing said memory subsystem for an upcoming access if said memory subsystem is currently powered down and at least one of said bus master initiated memory access break events has just occurred.

5. The method of claim 1 wherein generating said CPU throttle control signal is based on statistically predicting how to throttle said CPU on a time segment by time segment basis.

6. The method of claim 1 wherein generating said CPU throttle control signal comprises generating a STPCLK# signal that commands said CPU to begin processing when said STPCLK# signal is de-asserted (high) and commands said CPU to stop processing when said STPCLK# signal is asserted (low).

7. The method of claim 1 wherein said memory subsystem comprises dynamic random access memory (DRAM).

8. The method of claim 1 wherein said closing certain memory banks comprises pre-charging said certain memory banks.

9. The method of claim 1 wherein said powering down certain portions of said memory subsystem is accomplished by de-asserting clock enable (CKE) signals of said certain portions of said memory subsystem.

10. In a system employing a CPU and a memory subsystem, apparatus for performing adaptive power management of said memory subsystem, said apparatus comprising:
    a CPU throttle control (THR) module to generate a CPU throttle control signal indicating when said CPU is idle; and
    a memory controller (MC) module to generate memory power management signals based on at least one of said CPU throttle control signal, memory read/write signals, memory access break events, and bus master access requests, wherein said memory controller (MC) module comprises:
        a read/write buffer controller module to detect any pending memory read/write accesses and perform memory row and memory bank decoding;
        a DRAM controller module to control electrical interface signals and timing control signals, including said memory power management signals, to at least one DRAM module within said memory subsystem; and
        a DRAM clock enable controller (CKC) module responsive to said pending memory read/write accesses to indicate to said DRAM controller module which memory banks of said at least one DRAM module to close such that said DRAM controller module may power down at least one memory row of said at least one DRAM module when all memory banks of said at least one memory row are closed.

11. The apparatus of claim 10 further comprising an interface module interfacing between said memory controller (MC) module and one of an AGP graphics device, a PCI device, a PCI express device, and a 3GIO device to generate at least one of said memory access break events, said bus master access requests, and said memory read/write signals.

12. The apparatus of claim 10 further comprising a southbridge interface (SBRI) module interfacing between a southbridge module, a bus master module, DMA devices, and said memory controller (MC) module to generate at least one of said memory access break events, said bus master access requests, and said memory read/write signals.

13. The apparatus of claim 10 wherein said memory power management signals include at least one clock enable (CKE) signal such that at least one corresponding memory row of said memory subsystem is powered down when said at least one CKE signal is de-asserted.

14. The apparatus of claim 10 wherein said CPU throttle control signal is generated based on statistically predicting how to throttle said CPU on a time segment by time segment basis.

15. The apparatus of claim 10 wherein said CPU throttle control signal comprises a STPCLK# signal that commands said CPU to begin processing when said STPCLK# signal is de-asserted (high) and commands said CPU to stop processing when said STPCLK# signal is asserted (low).

16. The apparatus of claim 10 wherein at least one of said memory power management signals is used to close at least one memory bank of said memory subsystem and wherein closing said at least one memory bank comprises pre-charging said at least one memory bank.

* * * * *

UNITED STATES PATENT AND TRADEMARK OFFICE
CERTIFICATE OF CORRECTION

PATENT NO.       : 7,028,200 B2                                                              Page 1 of 1
APPLICATION NO.  : 10/163746
DATED            : April 11, 2006
INVENTOR(S)      : Kenneth Ma It is certified that error appears in the above-identified patent and that said Letters Patent is hereby corrected as shown below:

On the Title page, add
--Related U.S. Application Data
Continuation-in-part of application No. 10/146,554, filed on May 15, 2002, now U.S. Pat. No. 7,010,708.--

Column 1, lines 7-10, replace the text reading "The present application claims priority to and the benefit of application Ser. No. 10/146,554, filed on May 15, 2002, and incorporates said application herein by reference in its entirety." with --This application is a continuation-in-part of application Ser. No. 10/146,554, filed on May 15, 2002, now U.S. Pat. No. 7,010,708, and incorporates said application herein by reference in its entirety.--

Signed and Sealed this

Sixth Day of July, 2010

David J. Kappos
*Director of the United States Patent and Trademark Office*